US012725745B2

United States Patent

(12) United States Patent
Schafer et al.

(10) Patent No.: US 12,725,745 B2
(45) Date of Patent: Sep. 1, 2026

(54) DRIVE SYSTEM FOR A RESETTABLE INTERRUPTING SWITCH

(71) Applicant: Eaton Intelligent Power Limited, Dublin (IE)

(72) Inventors: Roger L. Schafer, Dacono, CO (US); Rajatha Bhat, Thornton, CO (US)

(73) Assignee: Eaton Intelligent Power Limited, Dublin (IE)

( * ) Notice: Subject to any disclaimer, the term of this patent is extended or adjusted under 35 U.S.C. 154(b) by 200 days.

(21) Appl. No.: 18/539,442

(22) Filed: Dec. 14, 2023

(65) Prior Publication Data

US 2024/0212956 A1 Jun. 27, 2024

Related U.S. Application Data

(60) Provisional application No. 63/435,385, filed on Dec. 27, 2022.

(51) Int. Cl.
*H01H 33/42* (2006.01)

(52) U.S. Cl.
CPC .................................. *H01H 33/42* (2013.01)

(58) Field of Classification Search
CPC ........ H01H 33/42; H01H 33/46; H01H 33/50; H01H 33/666; H01H 2033/6667; H01H 3/46; H01H 3/32; H01H 3/227; H01H 5/06; H01H 21/40
USPC ......... 218/140, 120, 153, 154, 118; 200/401
See application file for complete search history.

(56) References Cited

U.S. PATENT DOCUMENTS

| | | | | |
|---|---|---|---|---|
| 2,477,067 | A | 7/1949 | Kyle, Jr. et al. | |
| 4,568,804 | A | 2/1986 | Luehring | |
| 5,124,678 | A | 6/1992 | Yamat et al. | |
| 5,805,041 | A * | 9/1998 | Castonguay | H01H 71/1072 200/309 |
| 6,009,615 | A | 1/2000 | McKean et al. | |
| 6,362,445 | B1 * | 3/2002 | Marchand | H02B 13/0354 218/155 |
| 6,921,989 | B2 | 7/2005 | Baranowski et al. | |
| 7,663,457 | B2 | 2/2010 | Szeifert et al. | |
| 8,563,887 | B2 * | 10/2013 | Gottschalk | H01H 71/505 200/468 |
| 8,653,391 | B2 * | 2/2014 | Patten | H01H 3/227 200/401 |
| 9,685,280 | B2 * | 6/2017 | Benson | H01H 33/666 |
| 9,685,283 | B2 * | 6/2017 | Darko | H01H 33/121 |
| 9,741,482 | B2 | 8/2017 | Weisburgh et al. | |
| 10,276,318 | B1 | 4/2019 | Schafer | |
| 10,290,436 | B1 | 5/2019 | Schafer | |
| 10,290,437 | B1 | 5/2019 | Schafer | |

(Continued)

OTHER PUBLICATIONS

Serge Ledoux, European Patent Office, International Search Report and Written Opinion, counterpart PCT Application No. PCT/EP2023/025547, mail date Apr. 19, 2024, 14 pages total.

*Primary Examiner* — William A Bolton
(74) *Attorney, Agent, or Firm* — DiBerardino McGovern IP Group LLC

(57) ABSTRACT

A drive system for a single-phase switch includes: a first latch device; a trip latch device coupled to the first latch device; and a crank device coupled to the trip latch device and configured to control a switch actuation device to perform an open operation or a close operation in a switch. The trip latch device moves laterally during the open operation and during the close operation.

22 Claims, 11 Drawing Sheets

(56) References Cited

U.S. PATENT DOCUMENTS

| | | | | |
|---|---|---|---|---|
| 10,424,444 | B2 * | 9/2019 | Yang | G01R 31/3272 |
| 10,978,256 | B1 | 4/2021 | Schafer | |
| 11,387,066 | B2 * | 7/2022 | Hanna | H01H 71/24 |
| 2012/0103771 | A1 | 5/2012 | Patten | |
| 2014/0043119 | A1 * | 2/2014 | Bullock | H01H 33/6661 200/50.21 |
| 2015/0311009 | A1 * | 10/2015 | Ding | H01H 3/3015 218/140 |
| 2022/0238288 | A1 * | 7/2022 | Dauksas | H01H 33/66207 |

* cited by examiner

DRIVE SYSTEM FOR A RESETTABLE INTERRUPTING SWITCH

CROSS-REFERENCE TO RELATED APPLICATION

This application claims the benefit of U.S. Provisional Application No. 63/435,385, filed on Dec. 27, 2022 and titled DRIVE SYSTEM FOR A RESETTABLE INTERRUPTING SWITCH, which is incorporated herein by reference in its entirety.

TECHNICAL FIELD

This disclosure relates to a drive system for a resettable interrupting switch.

BACKGROUND

A resettable interrupting switch is a switch that is capable of interrupting relatively large currents. For example, a resettable interrupting switch may interrupt alternating-current (AC) currents of 20 kiloamperes (kA) root mean square (RMS) or greater. After interruption, the resettable switch is reset or returned to a known state and then closed such that the switch resumes current conduction. Many resettable interrupting switches include a moveable contact and a stationary contact. The moveable contact is driven to move away from the stationary contact to open the switch and driven to connect to the stationary contact to close the switch.

SUMMARY

In one aspect, a drive system for a single-phase switch includes: a first latch device; a trip latch device coupled to the first latch device; and a crank device coupled to the trip latch device and configured to control a switch actuation device to perform an open operation or a close operation in a switch. The trip latch device moves laterally during the open operation and during the close operation.

Implementations may include one or more of the following features.

In some implementations, the trip latch device includes at least one moveable pivot point, the trip latch device does not change shape during the open operation or the close operation, and the trip latch device changes shape during a trip operation.

The drive system also may include a drive toggle coupled to the first latch device. The drive toggle may be coupled to an operating interface; and the operating interface may be configured to operate the drive system in response to receiving an input to thereby cause an open operation or a close operation. The operating interface may be configured for manual operation, and the input may include a manual input. The operating interface may be configured for electronic operation, and the input may include an electronic input.

The drive system also may include a trip actuation device configured to act on the trip latch device; and the crank device may control the switch actuation device to perform the open operation in the switch in response to the trip actuation device acting on the trip latch device. The trip actuation device may include a trigger device that, when activated, causes the trip actuation device to move the trip latch device and the switch actuation device to perform the open operation in the switch. The trigger device may be activated based on a measured amount of electrical current flowing in the switch. The trigger device may include an electromagnetic actuator and a moveable element controlled by the electromagnetic actuator; and, when activated, the electromagnetic actuator may cause the moveable element to make contact with the trip latch device to move the trip latch device into a released position such that the crank controls the switch actuation device to perform the open operation in the switch.

Each of the first latch device and the trip latch device may include at least one mechanical linkage. The trip latch device may include: first and second mechanical linkages; the first mechanical linkage may be connected to the crank device at a first moveable pivot point and to the second mechanical linkage at a second moveable pivot point; and the second mechanical linkage may be coupled to the first latch device at a fixed pivot point. Each moveable pivot and each fixed pivot point may include a movement enhancement device.

The first latch device may include an over-toggle latch; and the trip latch device may include a trip over-toggle latch coupled to a linear tension spring.

In another aspect, an electrical apparatus includes: a switching system including: a first electrical contact; a second electrical contact; and a switch actuation device controllable to move the second electrical contact relative to the first electrical contact; and a drive system including: a first latch device; a trip latch device coupled to the first latch device; and a crank device coupled to the trip latch device and configured to control the switch actuation device to separate the first and second electrical contacts to thereby perform an open operation in the switching system or to join the first and second electrical contacts to thereby perform a close operation in the switching system. The trip latch device moves laterally without substantially changing shape during the open operation and during the close operation.

Implementations may include one or more of the following features.

The drive system may be configured to hold the actuation device such that the second electrical contact only moves relative to the first electrical contact during an open operation, a close operation, or a trip operation.

The trip latch device may include a plurality of moveable pivot points, the trip latch device may maintain a substantially linear shape during the open operation or the close operation, and the trip latch device may change shape during a trip operation.

The switch may have a current interruption rating of up to 25 kiloamperes (kA) and a voltage rating of 4 kilovolts (kV) to 38 kV.

The switching system may be a solid dielectric switch.

In another aspect, a system includes: a plurality of single-phase switches, each switch configured to be coupled to one phase of a multi-phase alternating current (AC) power system and each switch including: a first electrical contact; a second electrical contact; and a switch actuation device controllable to move the second electrical contact relative to the first electrical contact. The system also includes a plurality of drive systems, each drive system including: a first latch device; a trip latch device coupled to the first latch device; and a crank device coupled to the trip latch device and configured to control the switch actuation device of one of the single-phase switches to separate the first and second electrical contacts to thereby perform an open operation in the one of the single-phase switches or to join the first and second electrical contacts in the one of the single-phase switches to thereby perform a close operation in the one of the single-phase switches. The trip latch device moves laterally without substantially changing shape during the open operation and during the close operation.

Implementations may include one or more of the following features.

Each drive system may include a manual operating interface coupled to the first latch device, the manual operating interface of each drive system may be a handle, and the handles may be configured for simultaneous manual operation such that all of the single-phase switches open or close at the same time in response to operation of the handles.

Each drive system may include a trip actuation device configured to act on the trip latch device to drive the crank device of the one of the single-phase switches in response to an indication of a fault condition, and the trip actuation devices may be configured for simultaneous operation such that all of the single-phase switches trip at the same time in response to the fault condition.

Implementations of any of the techniques described herein may be a system, a drive system, an electrical apparatus, or a method. The details of one or more implementations are set forth in the accompanying drawings and the description below. Other features will be apparent from the description and drawings, and from the claims.

DRAWING DESCRIPTION

Figure 3:
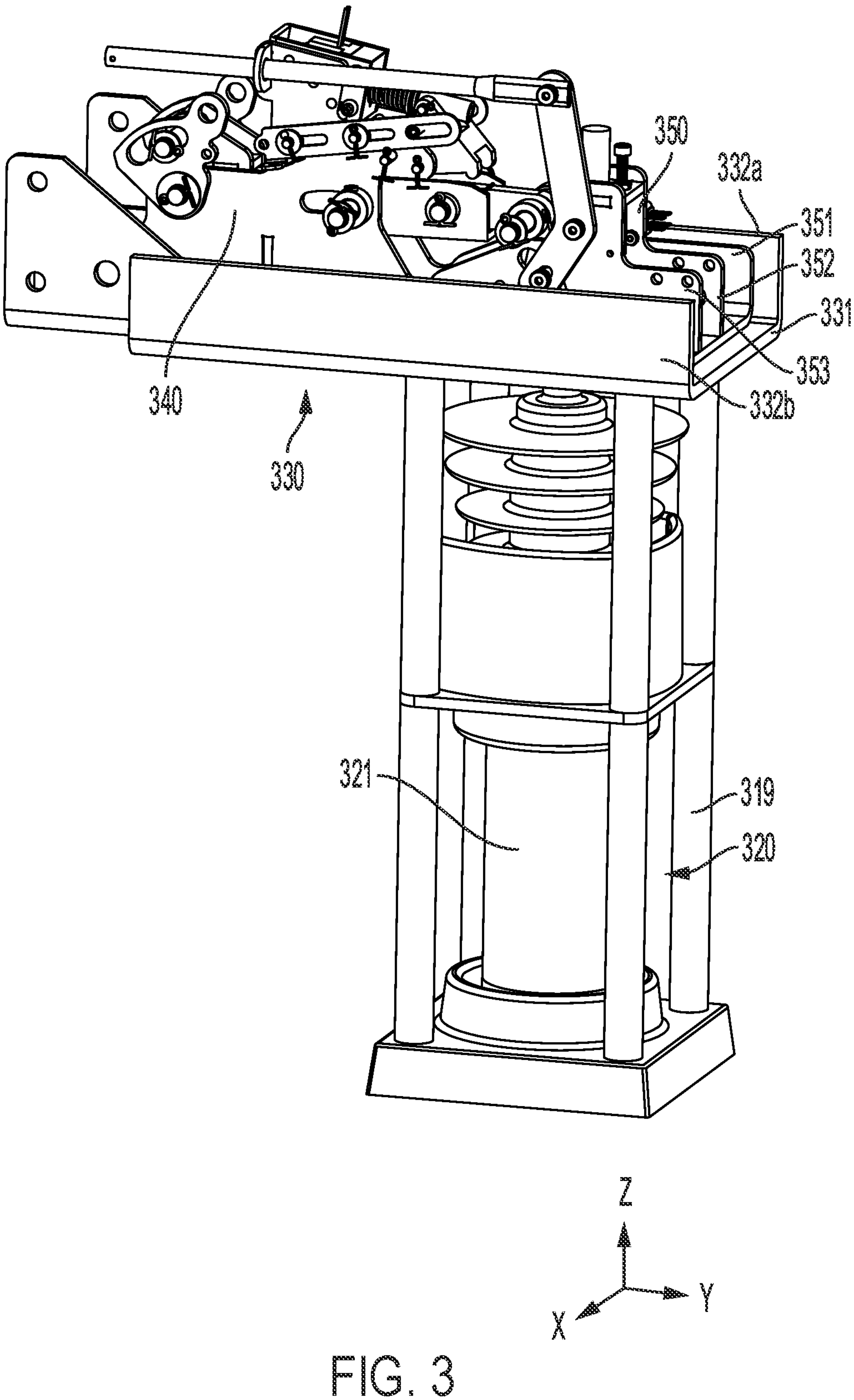
FIG. 3 is a perspective exterior view of an example of a switch and a drive system that controls the state of the switch.
Figure 7A:
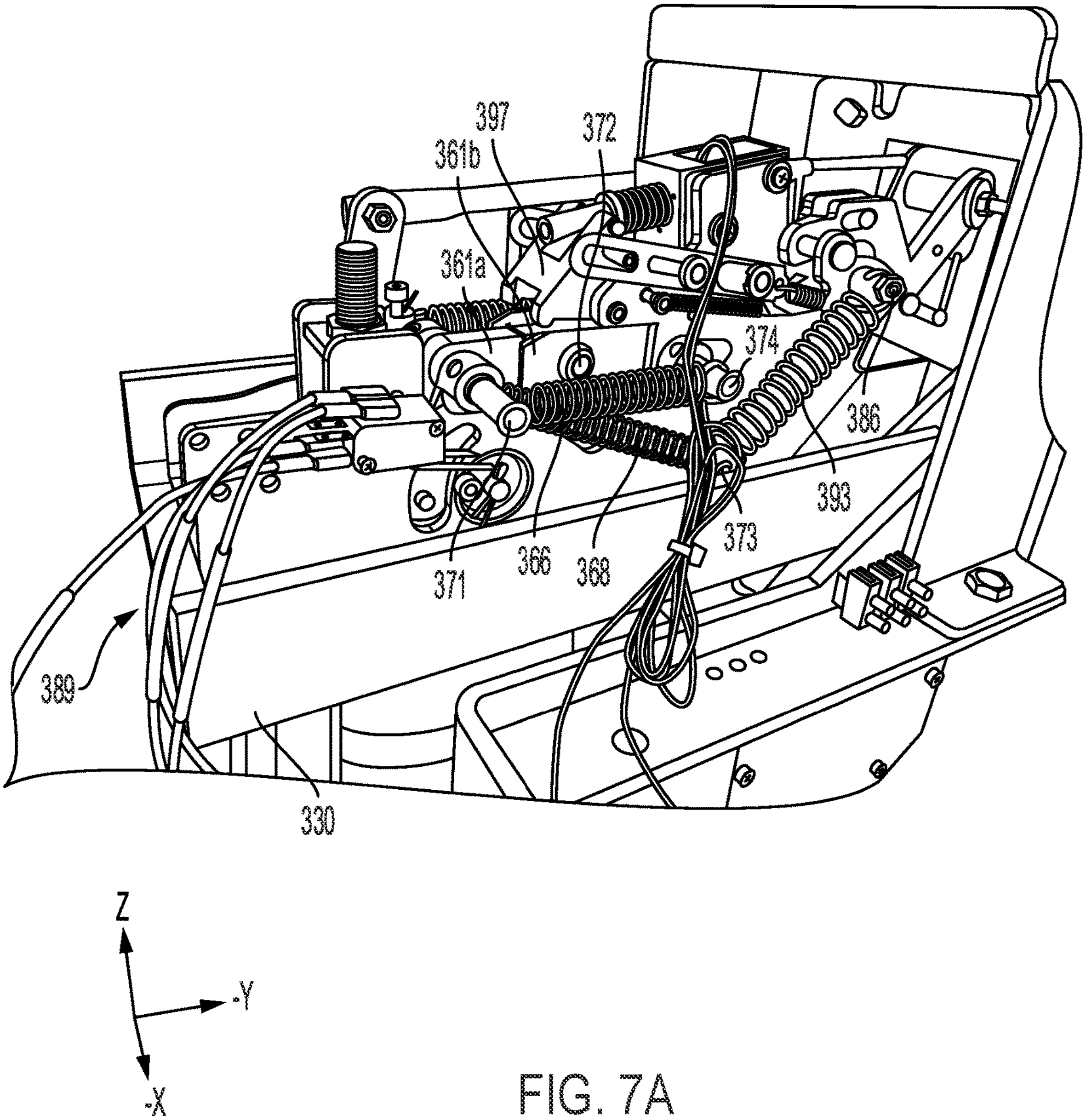
Figure 7B:
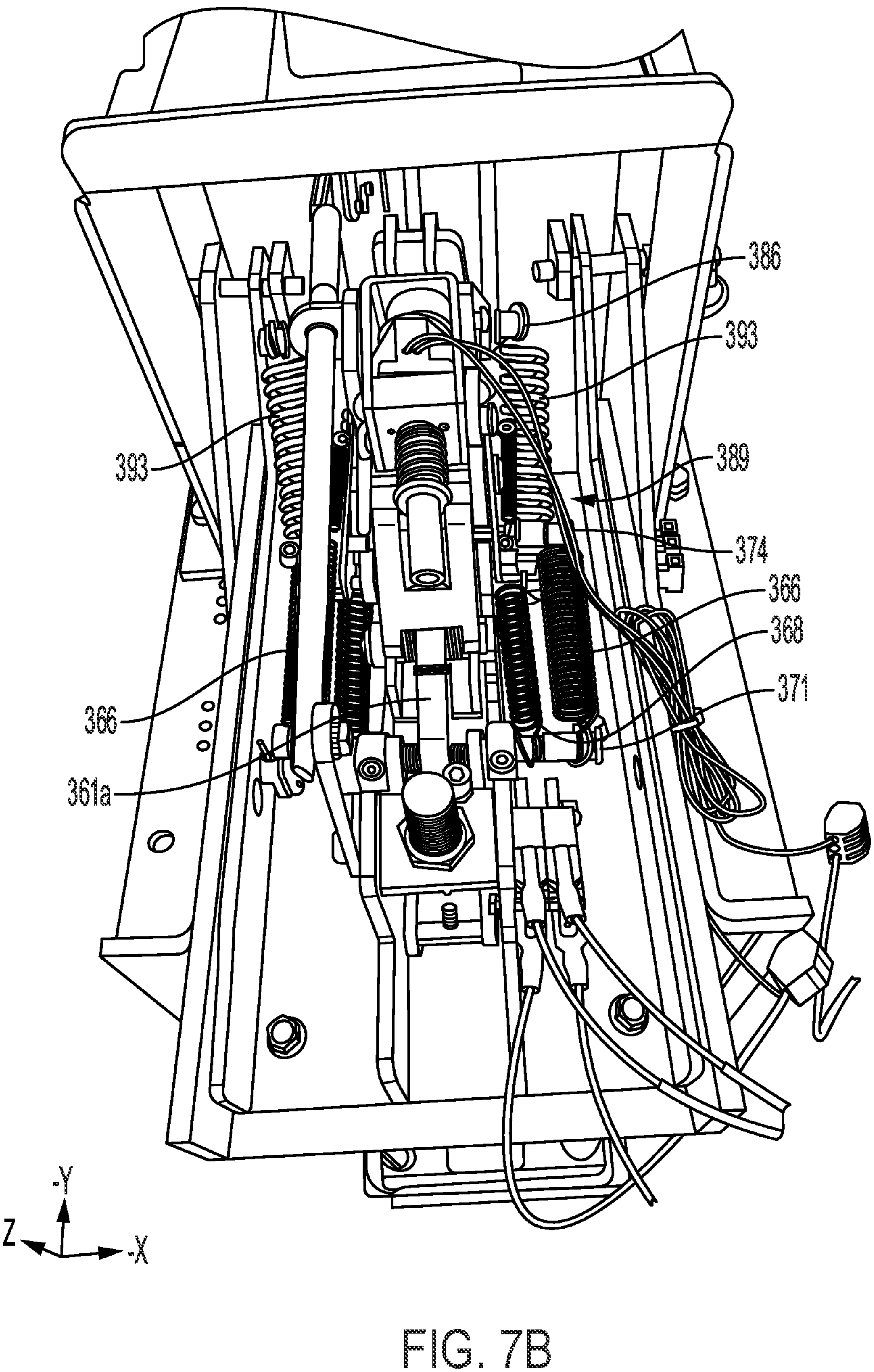

FIGS. 7A and 7B perspective views of the drive system of FIG. 3.

Figure 8:
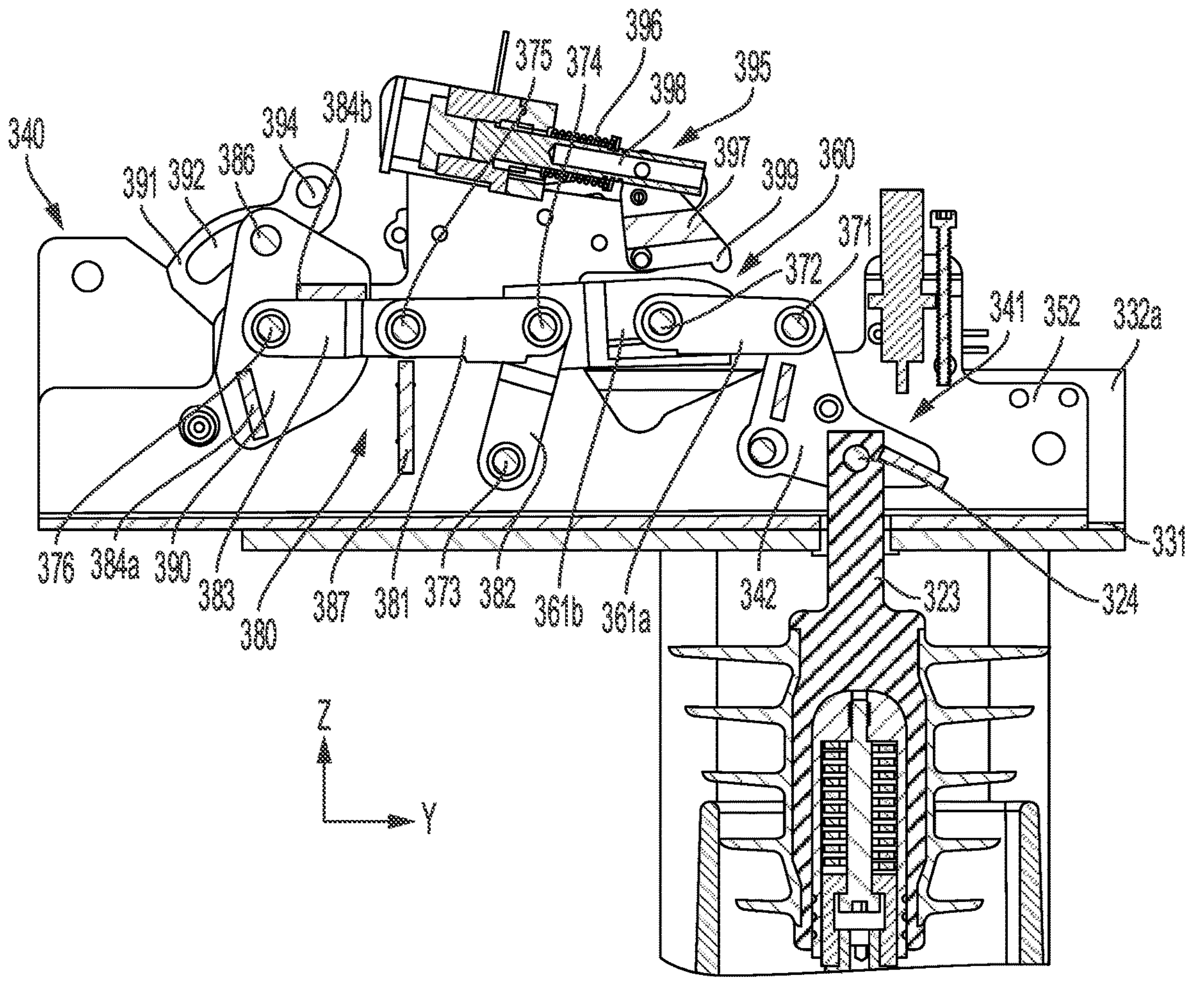

FIG. 8 shows the drive system of FIG. 3 when the switch is in the closed state.

Figure 9:
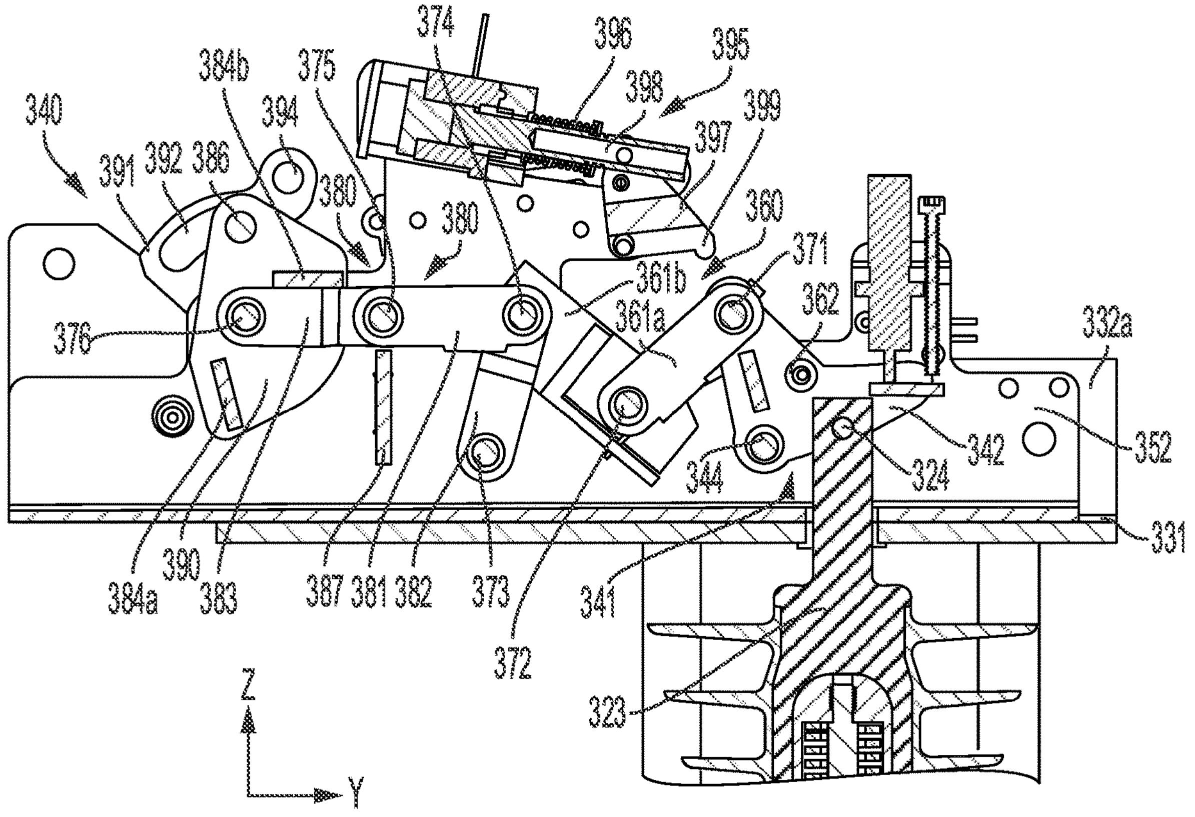

FIG. 9 shows the drive system of FIG. 3 when the switch has been tripped open.

Figure 10:
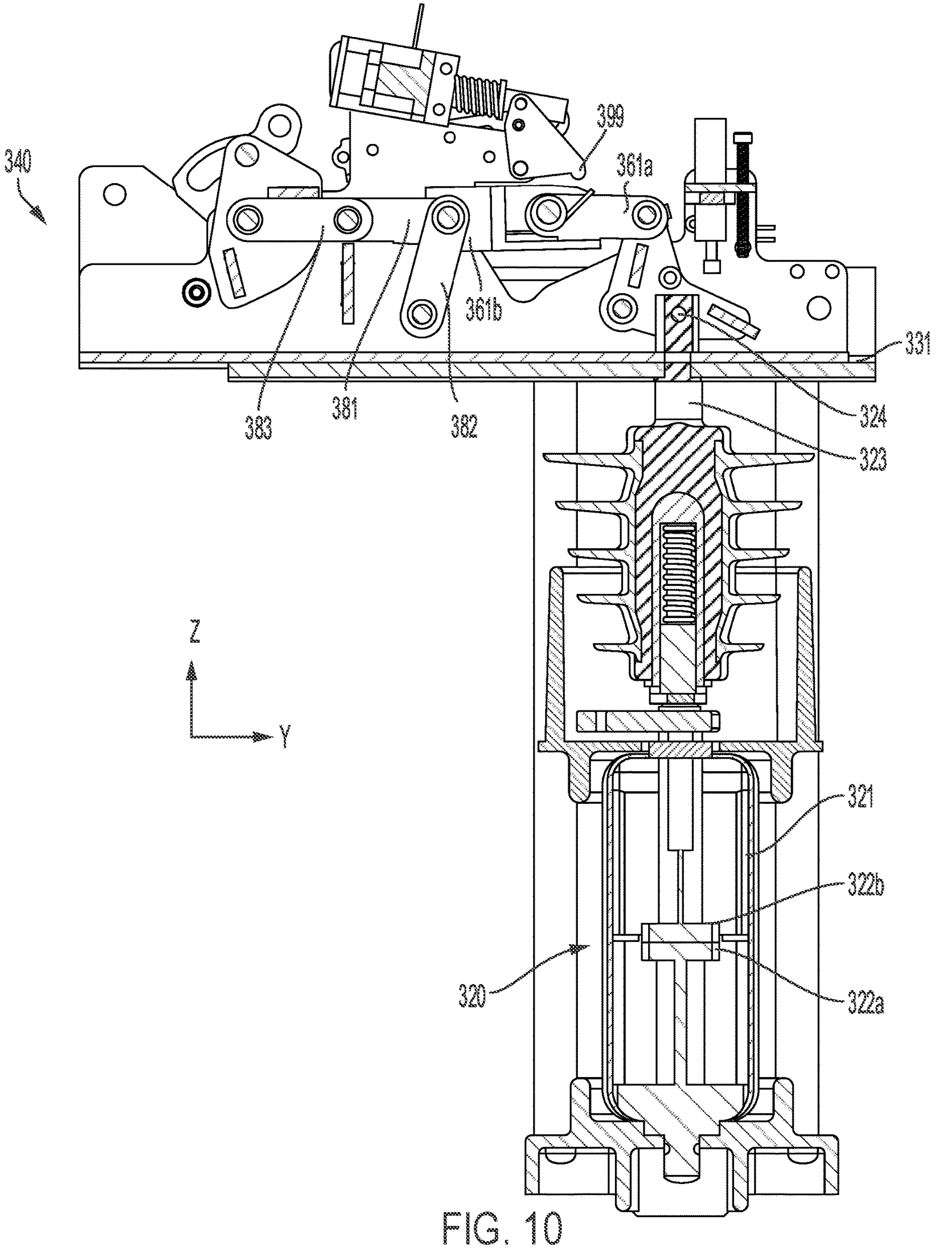

FIG. 10 is a cross-sectional interior view of the drive system of FIG. 3 when the switch is in the closed state.

Figure 11:
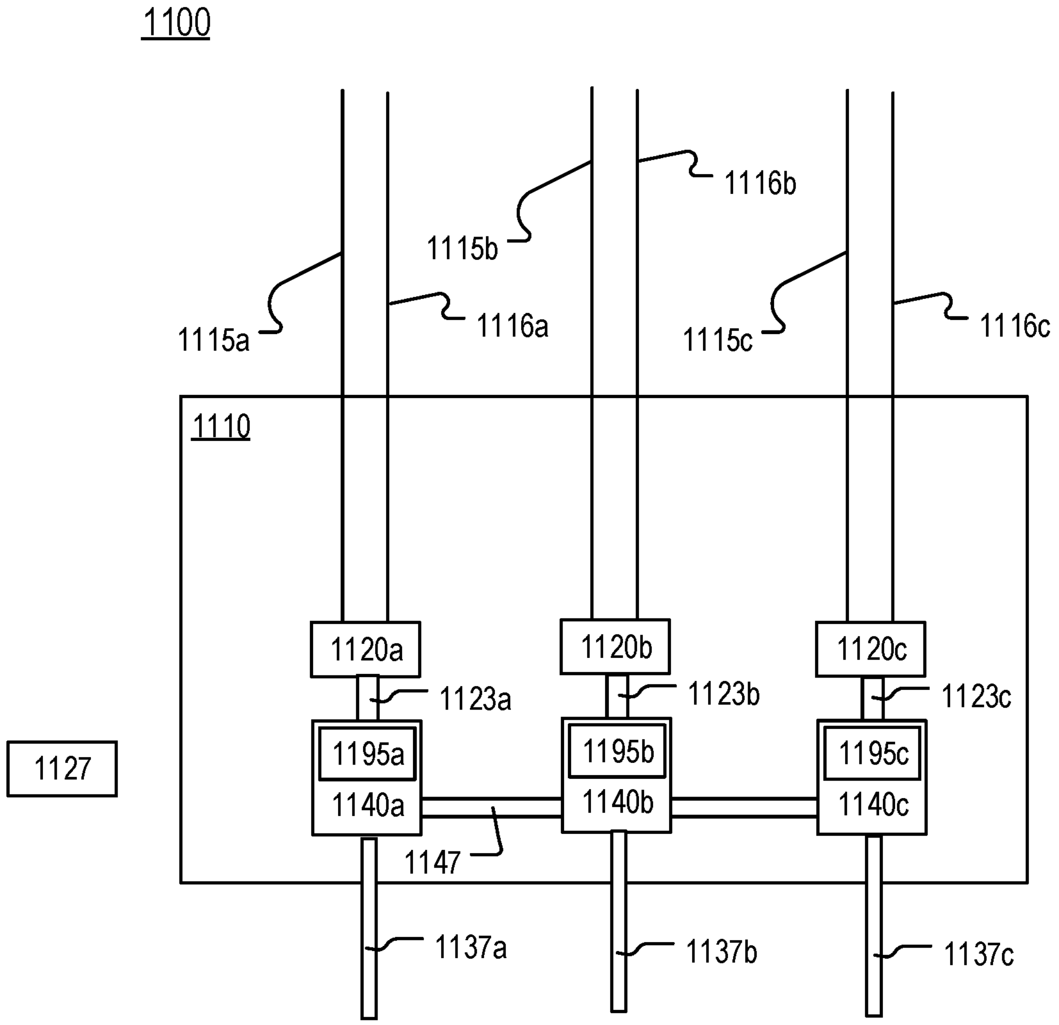

FIG. 11 is a block diagram of an example of a multi-phase system.

DETAILED DESCRIPTION

Figure 1:
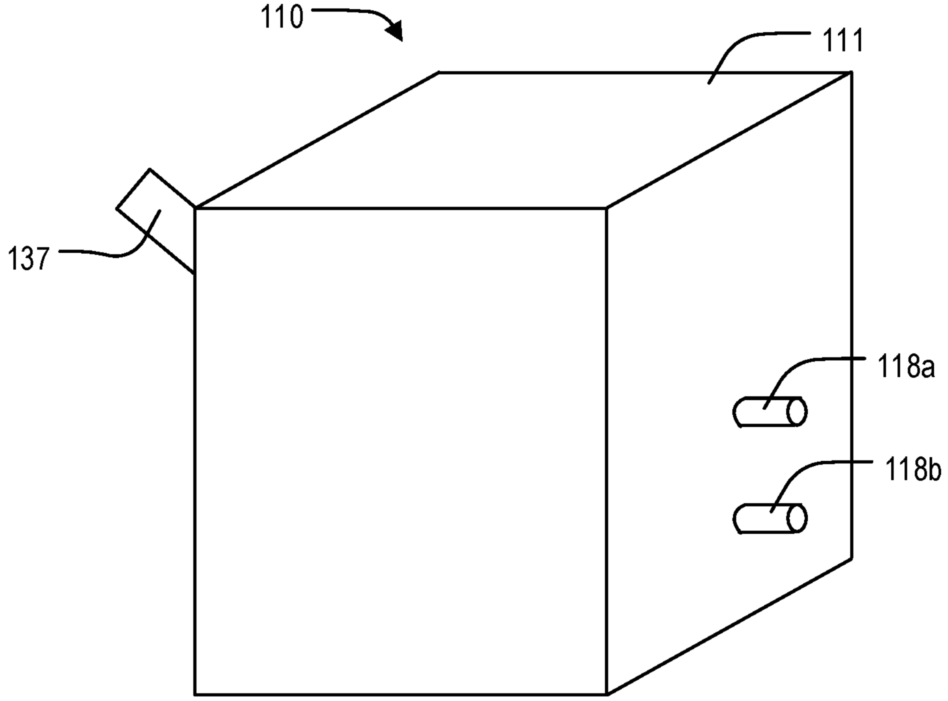
FIG. 1 is a perspective exterior view of an example of an electrical apparatus.
Figure 2:
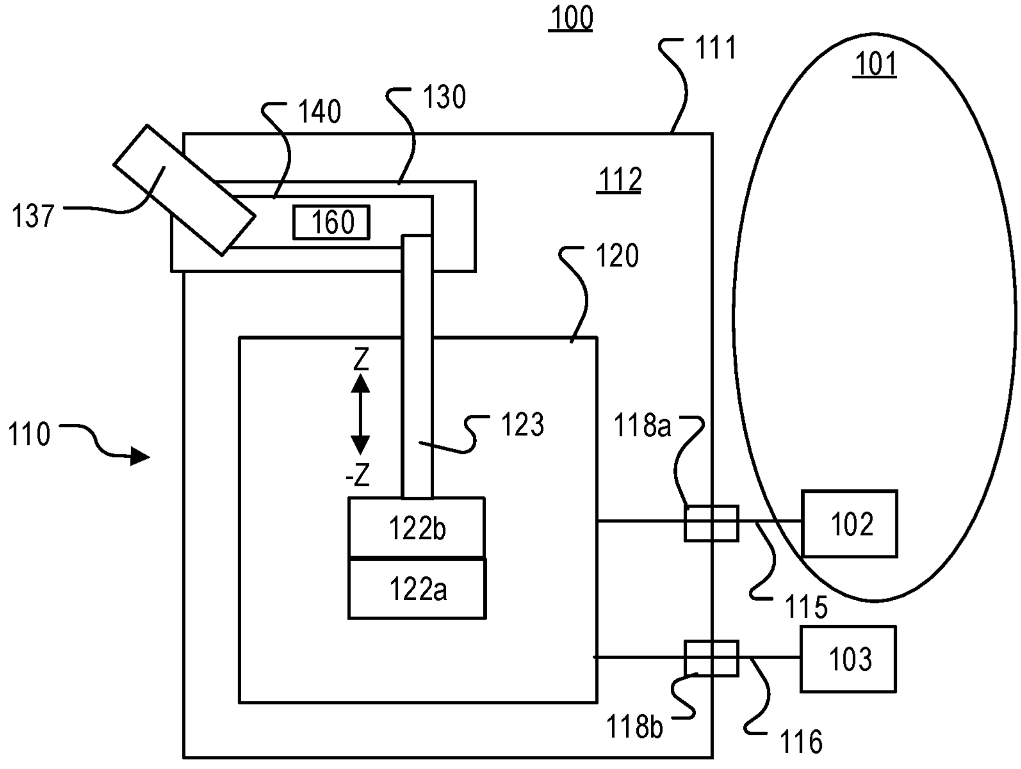
FIG. 2 is a cross-sectional block diagram of a system that includes the electrical apparatus of FIG. 1.

FIG. 1 is a perspective exterior view of an electrical apparatus 110. FIG. 2 is a cross-sectional block diagram of a system 100 that includes the electrical apparatus 110, a source 102, and a load 103. FIG. 2 shows a cross-sectional interior view of the electrical apparatus 110. The electrical apparatus 110 includes a single-phase interrupting switch 120 and a drive system 140 that is operable to control the state of the switch 120 by opening, closing, or tripping the interrupting switch 120. As discussed further below, the drive system 140 is a mechanical drive system that includes an over-toggle trip latch 160 that moves with all open, close, and trip operations performed by the drive system 140. The trip latch 160 moves laterally with open and close operations and moves rotationally and changes shape during trip and reset operations.

The switch 120 includes a stationary contact 122*a* and a moveable contact 122*b* that is connected to an actuation device 123. The actuation device 123 is any kind of actuation device. Specific examples of the actuation device 123 include, without limitation, an actuation rod, an operating rod, or a push/pull rod. When the stationary contact 122*a* and the moveable contact 122*b* are electrically connected, the switch 120 is closed and electrical current may flow in the switch 120. When the stationary contact 122*a* and the moveable contact 122*b* are not electrically connected, the switch 120 is open and electrical current cannot flow in the switch 120. FIG. 2 shows the switch 120 in the closed state.

The actuation device 123 is coupled to the drive system 140. The actuation device 123 moves the moveable contact 122*b* relative to the stationary contact 122*a* in the Z or −Z direction in response to activation of the drive system 140. In other words, the drive system 140 is controllable to cause the moveable contact 122*b* to separate from or join to the stationary contact 122*a* thereby control the state of the switch 120. The drive system 140 controls the actuation device 123 to open, close, or trip the switch 120.

The electrical apparatus 110 includes a housing 111 that defines an interior 112. The switch 120 is in the interior 112. The housing 111 may completely surround the switch 120, or the housing 111 may partially enclose the switch 120. The drive system 140 may also in the interior 112 and is mounted to the electrical apparatus 110 in a drive system mount 130.

The drive system 140 is also coupled to an operating interface 137 that is accessible from the exterior of the housing 111. The drive system 140 may be operated via the operating interface 137 such that the state of the switch 120 is controllable via the operating interface 137. The operating interface 137 may be a manual interface, an electronic interface, or may include electronic and manual elements.

In implementations in which the operating interface 137 is a manual interface, the drive system 140 is operated in response to manual manipulation of the interface 137. Examples of a manual interface include, without limitation, a handle, a button, or other tactile device that can be grasped by a human operator or an element (such as a hotstick) that is held by an operator.

In implementations in which the operating interface 137 is electronic, the drive system 140 is operated in response to electronic signals generated by manual and/or electronic inputs provided to the interface 137. For example, the electronic interface 137 may include an electronic processor and an electronic memory and may be programmable, and interaction with the interface 137 may occur via electrical signals provided from a location remote from the interface 137 and the electrical apparatus 110. In another example, the electronic interface may include a keypad, touch screen, or other tactile interface that produces electronic signals in response to manual manipulation. Examples of an electronic interface include, without limitation, an interface that supports radio-frequency, electrical, BlueTooth, cellular, inductive, and/or optical communications.

Additional details of the electrical apparatus 110, the switch 120, and the system 100 are provided before discussing the drive system in more detail.

The switch 120 is any kind of resettable switching mechanism that is capable of conducting electrical current and interrupting electrical current, and is also capable of being reset or controlled back to the closed operating state current to resume conducting current after interrupting electrical current. Specific examples of the switch 120 include, without limitation, a switchgear, a fault interrupter, a recloser, a circuit breaker, a vacuum interrupter, and an isolator. The switch 120 may be used in padmounted, vault-mounted, and/or submersible switchgear. The switch 120 may include an insulating material or an interrupting medium such as, for example, an insulating oil (for example, mineral oil) and/or gas (for example, air or sulfur hexafloride ($SF_6$)). In some implementations, the switch 120 is a solid dielectric switch that does not use mineral oil or $SF_6$ as an insulating medium. In these implementations, air may be used as the insulating medium for the switch 120. The switch 120 may have a voltage rating from 4 kilovolts (kV) to 38 kV and may be capable of interrupting currents of up to 20 kilo-amperes (kA) symmetrical RMS. These are example rating values, and other values are possible. For example, the switch 120 may be capable of interrupting currents greater than 20 kA symmetrical RMS. The switch 120 may be configured to interrupt currents that are less than 20 kA symmetrical RMS.

The switch 120 is connected to one phase of the source 102 through a first power line 115 and to the load 103 through a second power line 116. The power lines 115, 116 extend through respective bushings 118*a*, 118*b* into the interior 112 and are electrically connected to the switch 120. The power lines 115, 116 may be any type of medium that is capable of conducting electricity. For example the power lines 115, 116 may be transmission lines, distribution lines, wires, and/or electrical cables, just to name a few. When the switch 120 is closed, the source 102 is connected to the load 103. When the switch 120 is open, the source 102 is disconnected from the load 103.

The source 102 is part of or is connected to an alternating-current (AC) power grid 101. The AC power grid 101 is a three-phase power grid that operates at a fundamental frequency of, for example, 50 or 60 Hertz (Hz). The power grid 101 includes devices, systems, and components that transfer, distribute, generate, and/or absorb electricity. For example, the AC power grid 101 may include, without limitation, generators, power plants, electrical substations, transformers, renewable energy sources, transmission lines, reclosers and switchgear, fuses, surge arrestors, combinations of such devices, and any other device used to transfer or distribute electricity. The grid 101 may include one or more distributed energy resources (DER). A DER is an electricity-producing resource and/or a controllable load. Examples of DER include, for example, solar-based energy sources such as, for example, solar panels and solar arrays; wind-based energy sources, such as, for example wind turbines and windmills; combined heat and power plants; rechargeable sources (such as batteries); natural gas-fueled generators; electric vehicles; and controllable loads, such as, for example, some heating, ventilation, air conditioning (HVAC) systems and electric water heaters.

The AC power grid 101 may be low-voltage (for example, up to 1 kilovolt (kV)), medium-voltage or distribution voltage (for example, between 1 kilovolts (kV) and 35 kV), or high-voltage (for example, 35 kV and greater). The power grid 101 may include more than one sub-grid or portion. For example, the power grid 101 may include AC micro-grids, AC area networks, or AC spot networks that serve particular customers. These sub-grids may be connected to each other via switches and/or other devices to form the grid 101. Moreover, sub-grids within the grid 101 may have different nominal voltages. For example, the grid 101 may include a medium-voltage portion connected to a low-voltage portion through a distribution transformer. All or part of the power grid 101 may be overhead or underground.

The source 102 may be any type of source of AC electrical power, including, a generator, a renewable energy source, or a node or point of electrical connection in the grid 101. The load 103 may be any device that uses, transfers, or distributes electricity in a residential, industrial, or commercial setting, and the load 103 may include more than one device. For example, the load 103 may be a motor, an uninterruptable power supply, a capacitor, a power-factor correction device (such as a capacitor bank), or a lighting system. The load 103 may be a device that connects the electrical apparatus 110 to another portion of the power grid 101. For example, the load 103 may be a transformer, or a point of common coupling (PCC) that provides an AC bus for more than one discrete load.

Figure 5:
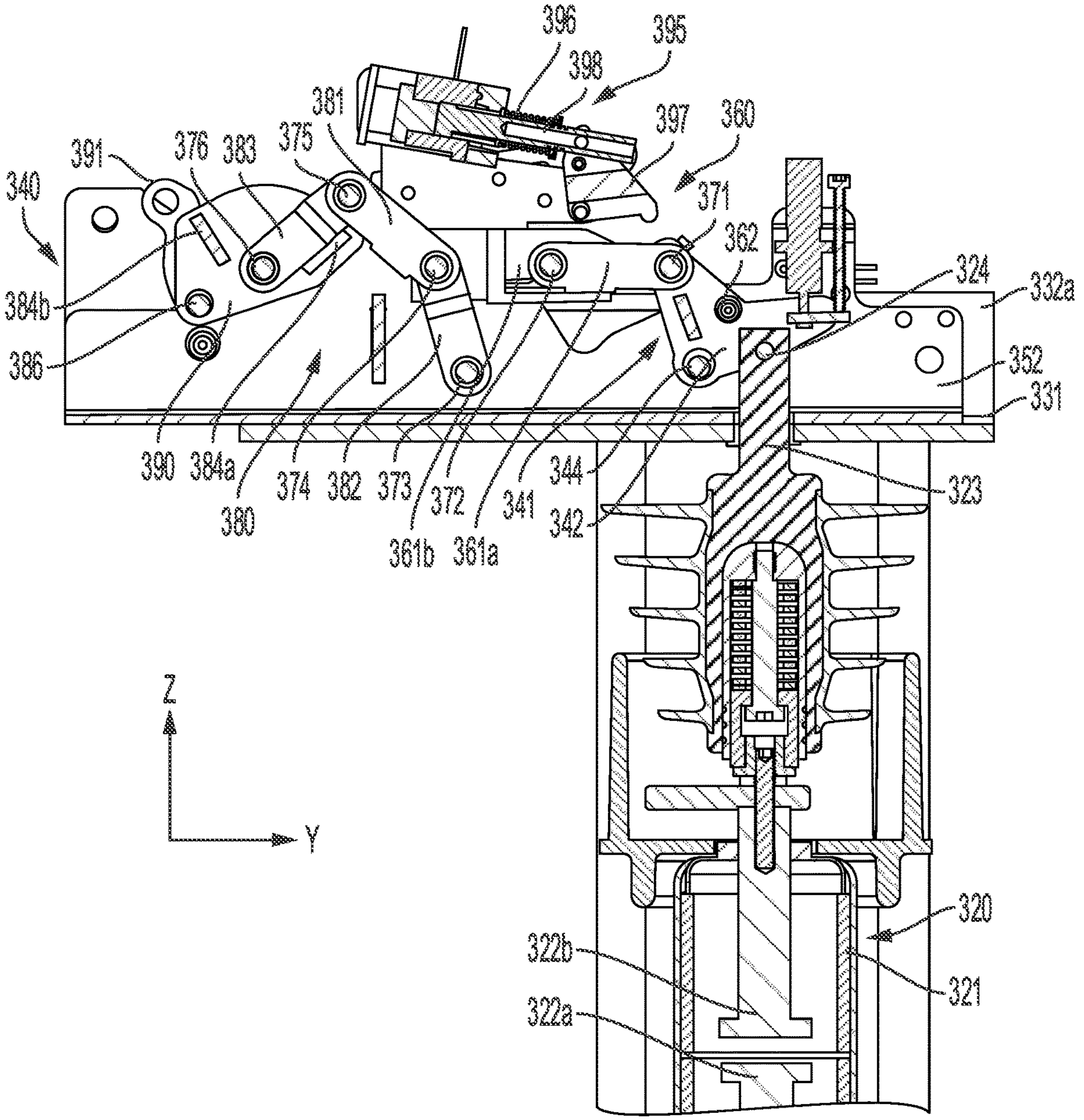
FIG. 5 is a side cross-sectional view of the drive system of FIG. 3 while the switch is in the open state.

FIG. 3 is a perspective exterior view of a switch 320 and a drive system 340 that controls the state of the switch 320. The example of FIG. 3 shows the configuration of the drive system 340 when the switch 320 is in the open state. FIG. 5 is a side cross-sectional view of the drive system 340 while the switch 320 is in the open state. FIGS. 8 and 9 show the side-cross sectional view of the drive system 340 when the switch 320 (not shown in FIGS. 8 and 9) is in the closed state and tripped, respectively. FIG. 10 includes a cross-sectional interior view of the switch 320 when the switch is in the closed state.

A specific configuration of the switch 320 and its associated elements is shown for the purpose of discussing the drive system 340. However, the drive system 340 may be used to move the moveable contact relative to the stationary contact in any resettable interrupting switch that includes a moveable contact and a stationary contact.

Referring to FIG. 3, the drive system 340 is mounted in a drive mount 330. The drive mount 330 supports the drive system 340 and holds the drive system 340 in a fixed position relative to the switch 320. The drive mount 330 also may be used to mount the drive system 340 in a housing, such as the housing 111 (FIGS. 1 and 2). The drive mount 330 also may be used to insulate the drive system 340 from the switch 320.

The switch 320 includes a vacuum interrupter 321. The vacuum interrupter 321 encloses a stationary contact 322*a* (FIG. 10) and a moveable contact 322*b* (FIG. 10). The contacts 322*a* and 322*b* are shown in FIG. 10, which includes an interior cross-sectional view of the vacuum interrupter 321 when the switch 320 is in the closed state. The contacts 322*a* and 322*b* are not visible in FIG. 3. The contacts 322*b* and 322*a* are similar, respectively, to the moveable contact 122*b* and the stationary contact 122*a* of FIG. 2. The moveable contact is coupled to an actuation device 323 (FIG. 5), which is coupled to the drive system 340. Activation of the drive system 340 also causes the actuation device 323 and the moveable contact to move along the Z axis.

In the example shown, the switch 320 is held in a structure that includes a plurality of insulating rods 319 (only one of which is labeled in FIG. 3). The insulating rods 319 provide support for the switch 320 and the drive system 340. The rods 319 may be made of any type of solid electrically insulating material, for example, National Electrical Manufacturers Association (NEMA) G-10 FR4 epoxy-glass or fiberglass polyester, such as NEMA GPO-3 802. The structure formed by the insulating rods 319 is provided as an example, and other implementations and configurations are possible. For example, the structure and insulation may be provided by a solid dielectric or epoxy system.

The drive mount 330 includes a base 331 that extends in the X-Y plane and side walls 332*a*, 332*b* that each extend in the Z direction from the base 331. The drive mount 330 is substantially U-shaped in the X-Z plane. The drive mount 330 is made of any type of rigid material. For example, the drive mount 330 may be made of stainless steel, aluminum, or a rigid polymer.

Figure 4:
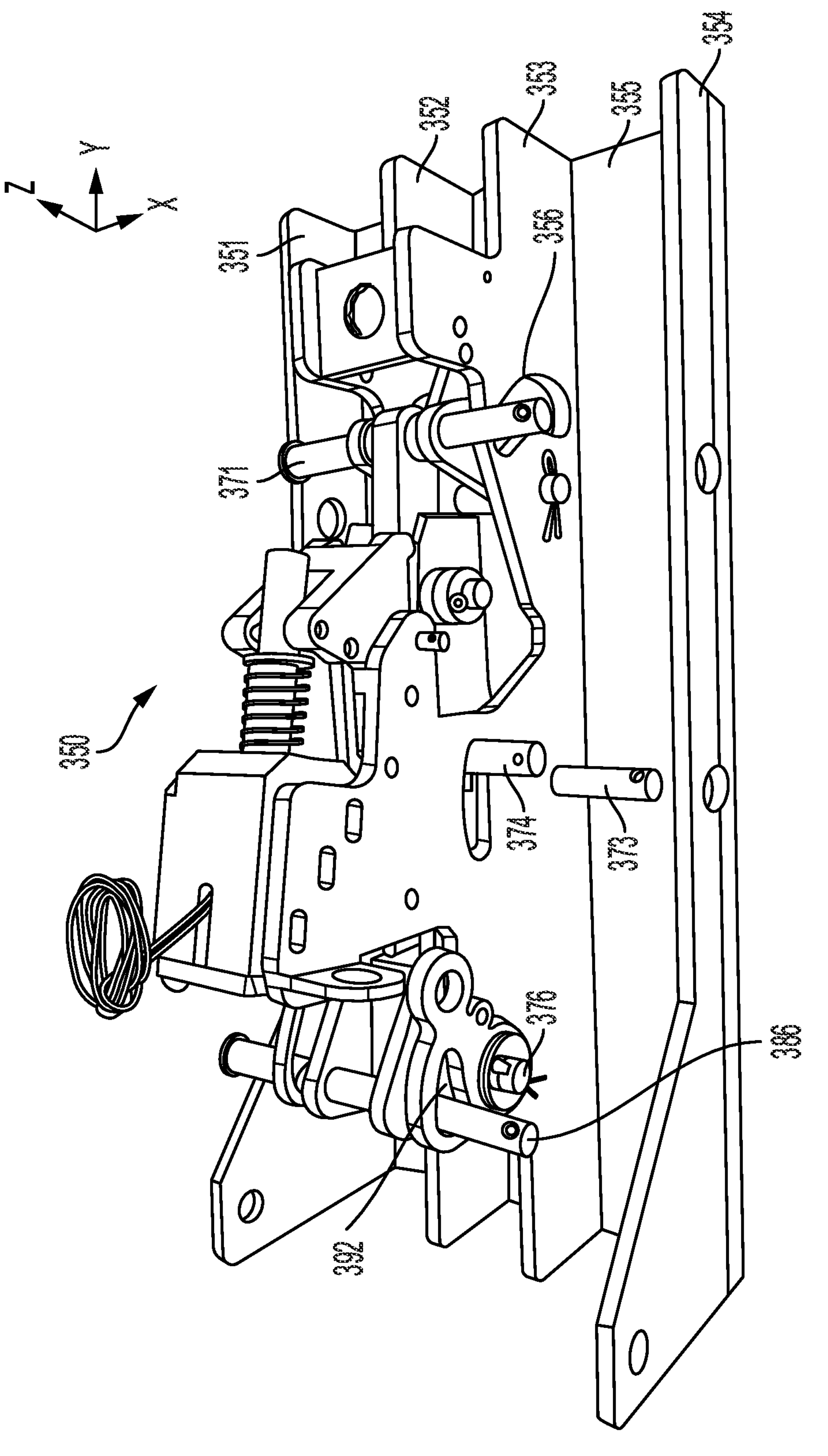
FIG. 4 is a perspective view of an example of a drive frame.

The drive system 340 includes a drive frame 350 that supports and holds various components of the drive system 340. The drive frame 350 is mounted in the drive mount 330 and is attached to the base 331. FIG. 4 is a perspective view of the drive frame 350. The drive frame 350 includes supports 351-354 that extend in the Z direction from a base 355. The supports 351-354 are separated from each other in the X direction. The supports 351-354 are made of a rigid material such as metal (for example, stainless steel or aluminum) or a rugged polymer. The drive frame 350 also includes fixed pivot points 373 and 376, moveable or floating pivot points 374 and 371, and a limiter post 386.

Figure 6:
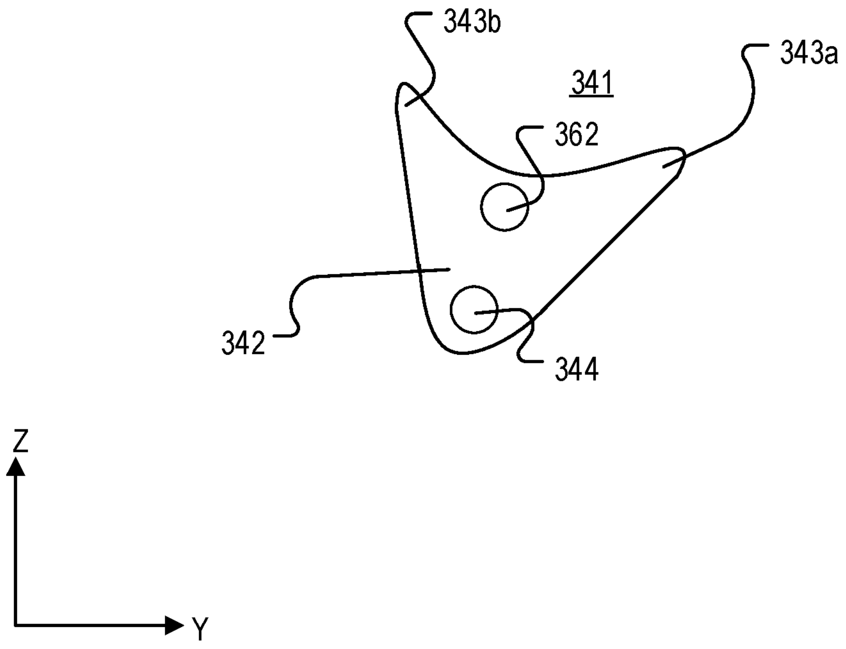
FIG. 6 is an example of a crank device.

Referring also to FIG. 5, the drive system 340 includes a crank device 341 that is coupled to the actuation device 323 at a coupling point 324. FIG. 6 shows the crank device 341 in the Y-Z plane. The crank device 341 has a body 342 and lobes 343*a*, 343*b* that extend from the body 342. The crank device 341 has a boomerang-shape in the Y-Z plane. The body 342 is attached to the support 352 at an attachment point 344.

The attachment point 344 includes any type of fastener that allows the crank device 341 to rotate in the Y-Z plane about the attachment point 344. For example, the attachment point 344 may be a circular opening that accommodates a rivet or pin that holds the crank device 341 to the support 352 while also allowing the crank device 341 to rotate in the Y-Z plane. The attachment point 344 also may include a movement enhancement device to ensure that the crank device 341 can rotate freely. The movement enhancement device may be, for example, a bushing and/or bearings. The movement enhancement device may be made of a composite polymer material. The movement enhancement device improves the usability and extends the lifetime of the drive device 340 by ensuring that the crank device 341 is able to rotate even under conditions in which the attachment point 344 is not manually lubricated with oil or a similar substance.

The crank device 341 also has a limiter post 362 that extends from the body 342 in the +X and −X directions (into and out of the page in FIGS. 5 and 6). When the crank device 341 is attached to the support 352, the limiter post 362 fits into a rotation slot 356 (FIG. 4) that is formed in the support 353 and in a rotation slot (not shown) that is formed in the support 352. When the crank device 341 rotates about the attachment point 344, the limiter post 362 moves between the ends of the rotation slot 356 as the crank device 341 rotates. The rotation slot in the support 352 is identical to the rotation slot 356 such that the limiter post 362 moves in each slot in the same manner. The range of rotation of the crank device 341 is limited by the rotation slot 356 and the rotation slot in the support 352.

The crank device 341 is attached to a trip latch device 360 that includes a first mechanical linkage 361*a* and a second mechanical linkage 361*b*. The first mechanical linkage 361*a* is attached to the lobe 343*b* of the crank device 341 at the floating or moveable pivot point 371 that is not attached to the support 352. The first mechanical linkage 361*a* is connected to the second mechanical linkage 361*b* at a floating pivot point 372 that is not attached to the support 352. The trip latch device 360 is attached to a first latch device 380. The first latch device 380 includes mechanical linkages 381, 382, and 383. One end of each of the mechanical linkage 381 and the mechanical linkage 382 is connected to the second mechanical linkage 361*b* at the floating pivot point 374. The floating pivot point 374 is not connected to the support 352. Each floating pivot point 371, 372, and 374 is capable of lateral movement along the Y axis and is also capable of moving along the Z axis.

The other end of the mechanical linkage 382 is connected to the support 352 at the fixed pivot point 373. The mechanical linkage 382 may rotate about the fixed pivot point 373 in the Y-Z plane, but the pivot point 373 is fixed and does not move relative to the support 352. The other end of the mechanical linkage 381 is connected to one end of the mechanical linkage 383 at a floating pivot point 375.

The other end of the mechanical linkage 383 is attached to a drive toggle 390 and to the support 352 at the fixed pivot point 376. The drive toggle 390 includes the post 386, which extends from the drive toggle 390 in the +X and −X directions (out of and into the page), and blocking elements 384*a* and 384*b*, which extend from the drive toggle in the +X direction (out of the page).

The drive toggle 390 also includes an interface connection 391 that couples to an external interface (such as the interface 137 of FIGS. 1 and 2) to allow the drive system 340 to be manually operated. The interface connection 391 includes an interface slot 392 (FIGS. 8 and 9) and an opening 394. The post 386 is received in the interface slot 392. The opening 394 may receive a rod or other structure that is coupled to the interface 137. By manipulating or controlling the interface 137, the user causes the drive toggle 390 to rotate in the Y-Z plane about the fixed pivot point 376 to drive the drive system 340, as discussed further below.

The drive system 340 also includes a trip actuation device 395 that is configured to act on the trip latch device 360. For example, the trip actuation device 395 may be configured to strike the trip latch device 360. The trip actuation device 395 may include a trigger device or a trigger mechanism that activates the trip actuation device 395 in response to the presence of a condition, or the trip actuation device 395 may be capable of being triggered by a command from a control system (such as a control system 1127 of FIG. 11). In implementations in which the trip actuation device 395 is configured to be triggered by a command from a control system, the control system may be electrically and/or mechanically coupled to the trip actuation device 395. The control system 1127 is an example of a control system that may be electrically coupled to the trip actuation device 395. For example, the trip actuation device 395 may be triggered in response to a measured amount of electrical current flowing in the switch 320 exceeding a threshold amount.

The trip actuation device 395 may be any device that is capable of acting on the trip latch device 360. In the example shown in FIG. 8, the trip actuation device 395 is a flux shift tripper (FST) that includes an electromagnetic actuator 396 that controls a moveable element 397. A FST is a device that provides a low-current trip operation and relies on a manual reset. The electromagnetic actuator 396 includes a solenoid and a permanent magnet, which holds a plunger 398 in a latched position when the magnetic field is active. The permanent magnet is nearly balanced by a compression spring. An electrical coil is around the plunger 398. By energizing the coil with a low-powered current pulse, the coil provides just enough magnetism to cancel out the remaining magnetic holding force, and the compression spring will cause the magnetic latch to unlatch, thus creating a “trip.” The trip releases the plunger 398. The plunger 398 is coupled to the moveable element 397 such that releasing the plunger 398 also causes the moveable element 397 to strike the first mechanical linkage 361*a* to trip the switch 320 open, as discussed further below with respect to FIG. 9.

After a trip, the FST is manually reset by pushing the plunger 398 back into the FST. The FST may be operated electrically through the control system 1127.

Although the example above discusses a FST, other trippers may be used for the trip-actuation device 395. Example other trippers that may be used as the trip-actuation device 395 include, without limitation, current solenoids or a thermally responsive curie element.

Referring to FIGS. 7A and 7B, the drive system 340 also includes an extension spring 366 (or linear tension spring 366), a spring 368, and a toggle drive spring 393. The extension spring 366 is connected to the floating pivot point 371 and the floating pivot point 374. The toggle drive spring 393 is connected to the fixed pivot point 373 and the limiter post 386. The spring 368 is connected to the floating point 371 and the fixed pivot point 373. There are two sets of the springs 366, 368, and 393, one on each side of the drive system 340, as shown in FIG. 7B. Moreover, the drive system 340 includes various wires and cables 389 that are coupled to the trip actuation device 395 or the crank device 341. The wires and cables 389 deliver electrical power to the trip actuation device 395 and also may carry control and/or data signals to and from the trip actuation device 395 or the crank device 341.

The operation of the drive system 340 is discussed next with respect to FIGS. 5, 8 and 9. FIG. 5 shows the drive system 340 when the switch 320 is in the open state, FIG. 8 shows the drive system 340 when the switch 320 is in the closed state, and FIG. 9 shows the drive system 340 when the switch 320 has been tripped open.

Referring to FIG. 8, under ordinary operating conditions, the switch 320 is closed and current flows in the switch 320. The trip latch device 360 and the first latch device 380 extend substantially along a line on the Y axis. The extension spring 366 is in an expanded state. The drive toggle 390 is at the end of its range of motion about the pivot point 376, with the blocking element 384*b* making contact with the mechanical linkage 383 and the limiter post 386 being against one end of the interface slot 392. The toggle drive spring 393 is in a relaxed state. The first latch device 380 is also held against a blocking element 387 that extends from the support 352 in the +X direction and also prevents further movement of the drive toggle 390 in the clockwise direction. The mechanical linkage 382 is positioned at a slight angle relative to the Z axis.

Referring also to FIG. 5, to open the switch 320, the drive toggle 390 is rotated counterclockwise about the pivot point 376. The drive toggle 390 may be rotated counterclockwise by manipulating the operating interface 137 (FIGS. 1 and 2). For example, the operating interface may include a rod or a hook that interacts with the opening 394. In this example, the operator pulls on the rod or hook to cause the drive toggle 390 to rotate about the pivot point 376 in the counterclockwise direction. The drive toggle 390 rotates, and the blocking element 384*a* makes contact with the mechanical linkage 383, causing the mechanical linkage 383 to rotate counterclockwise about the pivot point 376. The rotation of the mechanical linkage 383 also causes the floating pivot point 375 to move in the +Z direction and pulls the mechanical linkages 381 and 382 toward the drive toggle 390 (in the −Y direction in FIGS. 5 and 8). The first latch device 380 is shortened in the Y direction. The drive toggle spring 393 expands. The rotation of the drive toggle 390 in the counterclockwise direction also pulls the floating pivot point 374 and the trip latch device 360 in the −Y direction, with the first and second mechanical linkages 361*a* and 361*b* remaining in substantially a straight line along the Y axis. In other words, when transitioning the switch 320 from the closed state (FIG. 8) to the open state (FIG. 5), the trip latch device 360 generally moves laterally in the −Y direction without substantial change in the orientation of the first mechanical linkage 361*a* and the second mechanical linkage 361*b* relative to each other. The extension spring 366 remains in the expanded state.

The lateral motion of the trip latch device 360 in the −Y direction causes the crank device 341 to rotate about the attachment point 344 in the counterclockwise direction. The crank device 341 is coupled to the actuation device 323 at the coupling point 324. Rotating the crank device 341 in the counterclockwise direction pulls the actuation device 323 in the +Z direction, causing the moveable contact 322*b* to separate from the stationary contact 322*a*. Separating the moveable contact 322*b* from the stationary contact 322*a* opens the switch 320.

To close the switch 320 from the open state (FIG. 5), the drive toggle 390 is rotated about the pivot point 376 in the clockwise direction. The operating interface 137 (FIGS. 1 and 2) is used to rotate the drive toggle 390 in the clockwise direction until the blocking element 384*b* makes contact with the mechanical linkage 383, causing it to rotate in the clockwise direction. The rotation of the mechanical linkage 383 in the clockwise direction pulls the floating pivot point 375 in the −Z direction until the mechanical linkages 383 and 381 extend substantially in a line along the Y axis and make contact with the blocking element 387, and the mechanical linkage 382 rotates clockwise about the fixed pivot point 373. The trip latch device 360 remains extended in a line along the Y axis and moves in the +Y direction. The lateral motion of the trip latch device 360 also moves the floating pivot point 371 in the +Y direction, pushing the lobe 343*b* and causing the crank device 341 to rotate in the clockwise direction about the attachment point 344. Rotating the crank device 341 in the clockwise direction moves the actuation device 323 in the −Z direction such that the moveable contact 322*b* makes contact with the fixed contact 322*a* and the switch 320 is again in the closed state (FIG. 8).

Additionally, and referring also to FIG. 9, the switch 320 may be tripped open in the presence of an error condition (such as a fault) or other event. The tripping process is different from the ordinary opening process that transitions the switch 320 from the closed state (FIG. 8) to the open state (FIG. 5) discussed above. For example, the switch 320 is tripped open in response to a condition in the switch 320 and/or a condition in the grid 101 (FIG. 2) rather than being opened via the interface 137 and may be tripped open regardless of the state of the interface 137.

The drive system 340 includes the trip actuation device 395, which is an electromagnetic actuator in the example shown. The electromagnetic actuator holds the moveable element 397 in place (not in contact with the trip latch device 360) until a triggering condition is detected. Examples of a triggering condition include, without limitation, the measurement of a current in the switch 320 that exceeds a pre-defined threshold, a measurement of a voltage that exceeds a pre-defined threshold, and/or measurement of power that exceeds a pre-defined threshold. The threshold may be a peak or RMS value that indicates the presence of a fault, for example. In some implementations, the trip actuation device 395 may be intentionally activated by the operator to cause the switch 320 to trip even if no fault conditions are measured or detected.

In response to the detection of a triggering condition and/or an intentional activation, the electromagnetic actuator releases the moveable element 397 such that it makes contact with the trip latch device 360. Prior to the moveable element 397 making contact with the trip latch device 360, the first and second mechanical linkages 361*a* and 361*b* extend substantially along the Y axis, as shown in FIG. 8, and the extension spring 366 is in the expanded state. A tip 399 of the moveable element 397 strikes the mechanical linkage 361*b*, causing the tension in the expanded extension spring 366 to release or relax. The spring 366 relaxes, pulling the floating pivot point 374 in the Y direction and the floating pivot point 371 in the −Y direction (such that the floating pivot points 371 and 374 move toward each other) and pushing the floating pivot point 372 in the −Z direction. As a result, the trip latch device 360 is shortened along the Y axis.

As shown in FIG. 9, after the tip 399 makes contact, the mechanical linkage 361*b* and mechanical linkage 361*a* no longer extend along the Y axis in a substantially straight line and are instead angled relative to each other. The movement of the floating pivot point 371 in the −Y direction pulls the lobe 343*b* of the crank device 341, causing the crank device 341 to rotate in the counterclockwise direction about the attachment point 344. The counterclockwise rotation of the crank device 341 pulls the actuation device 323 in the +Z direction and separates the moveable contact 322*b* from the stationary contact 322*a* to open the switch 320. During the trip operation, the first latch device 380 and the drive toggle 390 do not move and are not involved in opening the switch 320.

After the trip operation is complete and the triggering condition is resolved, the drive system 340 may be transitioned from the condition shown in FIG. 9 to a reset condition, which is the same as the open condition shown in FIG. 5. To transition the drive system 340 to the reset condition, the interface 137 is manipulated to cause the drive toggle 390 to rotate counterclockwise until the blocking element 384*a* contacts the mechanical linkage 383 and pulls the mechanical linkage 383 such that the mechanical linkage 383 also rotates in the counterclockwise direction about the pivot point 376. This pulls the floating pivot point 374 closer to the pivot point 376, collapsing the first latch device 380 and pulling the trip latch device 360 until the mechanical linkages 361*a* and 361*b* extend generally in a line along the Y axis and the extension spring 366 is again expanded. The crank device 341 does not rotate during the return to the reset/open position after the trip operation, and the state of the switch 320 does not change when the drive system 340 is placed in the reset/open condition after a trip operation. After the drive system 340 is in the reset/open condition, the switch 320 may be closed following the procedure discussed above.

Thus, the trip latch device 360 moves during the open, close, reset, and trip operations. During the open operation, the trip latch device 360 extends generally along the Y axis and moves linearly or in-line in the −Y direction without changing shape. During the close operation, the trip latch device 360 extends generally along the Y axis and moves linearly or in-line in the +Y direction without changing shape. During the reset operation, the trip latch device 360 moves rotationally and changes shape from a shortened or collapsed state (FIG. 9) to an extended state (FIG. 5). During the trip operation, the trip latch device 360 moves rotationally and changes shape from the extended state (FIG. 5) to the shortened or collapsed state (FIG. 9).

The trip latch device 360 is a flying latch and is part of the drive system 340 in all open, closing, and trip operations. Furthermore, the trip latch device 360 is capable of different types of movement. The trip latch device 360 moves in a linear or in-line manner during ordinary opening and closing operations, and the trip latch 360 does not change shape during these operations. The trip latch device 360 moves rotationally and changes shape (for example, compresses along at least one axis) during a trip operation. The trip latch 360 expands along the Y axis during the reset operation. Moreover, the trip latch device 360 is trip-free. Thus, the contacts 322*a*, 322*b* of the switch 320 can return to the open position and remain in the open position when an opening operation follows a closing operation, regardless of whether the closing signal, force, or action is maintained.

The drive systems 140 and 340 are for use with a single-phase switch. However, the drive systems 140 and 340 may be used to build a multi-phase electrical apparatus, as shown in the example of FIG. 11.

FIG. 11 is a block diagram of a system 1100. The system 1100 includes a three-phase electrical apparatus 1110. The electrical apparatus 1110 includes three single-phase switches (or poles) 1120*a*, 1120*b*, 1120*c*, each of which is connected to one phase of a three-phase power source and a three-phase load by respective AC power line pairs 1115*a*, 1116*a*; 1115*b*, 1116*b*; 1115*c*, 1116*c*. Each single-phase switch 1120*a*, 1120*b*, 1120*c* is similar to the switch 120 shown in FIG. 2. The electrical apparatus 1110 also includes drive systems 1140*a*, 1140*b*, 1140*c*, each of which is similar to the drive system 340 discussed above. The position of a moveable contact relative to a stationary contact in each single-phase switch 1120*a*, 1120*b*, 1120*c* is controlled by moving a respective actuation device 1123*a*, 1123*b*, 1123*c*. Each actuation device 1123*a*, 1123*b*, 1123*c* is moved by its respective drive system 1140*a*, 1140*b*, 1140*c* in a manner that is similar to the operation of the drive system 340 and the actuation device 323.

The electrical apparatus 1110 also includes handles 1137*a*, 1137*b*, 1137*c*. The handle 1137*a* is coupled to the drive system 1140*a*, the handle 1137*b* is coupled to the drive system 1140*b*, and the handle 1137 is coupled to the drive system 1140*c*. For example, the handles 1137*a*, 1137*b*, 1137*c* may be connected to an interface such as the interface connection 391 (FIGS. 5, 8, and 9). The handles 1137*a*, 1137*b*, 1137*c* may be mechanically connected to each other by a rod 1147 such that operating any one of the handles 1137*a*, 1137*b*, 1137*c* may operate all of the handles 1137*a*, 1137*b*, 1137*c*. When the rod 1147 is present, only one of the handles 1137*a*, 1137*b*, 1137*c* may also be used to operate all three poles, and the electrical apparatus 1110 may be implemented to include fewer than all of the handles 1137*a*, 1137*b*, 1137*c*. In this way, the electrical apparatus 1110 is configured for ganged operation and all of the switches 1120*a*, 1120*b*, 1120*c* may be opened or closed simultaneously.

The electrical apparatus 1110 also includes trip actuation devices 1195*a*, 1195*b*, 1195*c*, each of which is similar to the trip actuation device 395 and each of which is in communication with the control system 1127. The control system 1127 includes an electronic processor, an electronic memory, and a communications interface that sends and receives signal. For example, the control system 1127 may receive signals that include indications of various measured quantities, such as a measured voltage and/or current in one or more of the switches 1120*a*, 1120*b*, 1120*c* measured by one or more voltage, current, and/or power sensors (not shown). The control system 1127 also sends commands to one or more of the trip actuation devices 1195*a*, 1195*b*, 1195*c* based on the measured data. For example, the control system 1127 may store various threshold current and/or voltage values that, if exceeded, indicate that a fault is present in the electrical apparatus 1110 and/or one or more of the loads 1116*a*, 1116*b*, 1116*c*. The control system 1127 may generate command signals when a fault is present.

The trip actuation device 1195*a* is configured to trip the switch 1120*a* by acting on the drive system 1140*a*. The trip actuation device 1195*b* is configured to trip the switch 1120*b* by acting on the drive system 1140*b*. The trip actuation device 1195*c* is configured to trip the switch 1120*c* by acting on the drive system 1140*c*. Each trip actuation device 1195*a*, 1195*b*, 1195*c* may be configured to act on its respective drive system in response to receiving a command from the control system 1127 after a fault is detected regardless of the orientation or state of handles 1137*a*, 11376, 1137*c*. Moreover, the electrical apparatus 1110 may be configured such that one of the trip actuation devices 1195*a*, 1195*b*, 1195*c* can actuate all three drive systems 1140*a*, 1140*b*, 1140*c*. In these implementations, the electrical apparatus 1110 may include fewer than all of the trip actuation devices 1195*a*, 1195*b*, 1195*c*.

The implementations discussed above and other implementations are within the scope of the claims. For example, any or all of the pivot points 371-376, the coupling point 324, or any other interface where two or more elements are connected in a manner that allows them to move relative to each other while remaining connected may include a movement enhancement device such as discussed with respect to the attachment point 344. The movement enhancement device may be, for example, a bushing or gasket made of a polymer material, and/or bearings.

What is claimed is:

1. A drive system for a single-phase switch, the drive system comprising:
- a first latch device;
- a trip latch device coupled to the first latch device; and
- a crank device coupled to the trip latch device and configured to control a switch actuation device to move a moveable electrical contact of a switch relative to a fixed electrical contact of the switch, wherein the trip latch device moves laterally during an ordinary open operation of the switch and during an ordinary close operation of the switch, and the trip latch device moves during a trip operation of the switch.

2. The drive system of claim 1, wherein the trip latch device comprises at least one moveable pivot point, the trip latch device does not change shape during the ordinary open operation or the ordinary close operation, and the trip latch device changes shape during the trip operation.

3. The drive system of claim 1, further comprising a drive toggle coupled to the first latch device.

4. The drive system of claim 3, wherein the drive toggle is coupled to an operating interface; and the operating interface is configured to operate the drive system in response to receiving an input to thereby cause the moveable electrical contact to move relative to the fixed electrical contact.

5. The drive system of claim 4, wherein the operating interface is configured for manual operation, and the input comprises a manual input.

6. The drive system of claim 4, wherein the operating interface is configured for electronic operation, and the input comprises an electronic input.

7. The drive system of claim 1, further comprising a trip actuation device configured to act on the trip latch device; and wherein the crank device controls the switch actuation device to move the moveable electrical contact relative to the fixed electrical contact to perform the trip operation in the switch in response to the trip actuation device acting on the trip latch device.

8. The drive system of claim 7, wherein the trip actuation device comprises a trigger device that, when activated, causes the trip actuation device to act on the trip latch device by moving the trip latch device.

9. The drive system of claim 8, wherein the trigger device is activated based on a measured amount of electrical current flowing in the switch.

10. The drive system of claim 9, wherein the trigger device comprises an electromagnetic actuator and a moveable element controlled by the electromagnetic actuator; and, when activated, the electromagnetic actuator causes the moveable element to make contact with the trip latch device to move the trip latch device into a released position.

11. The drive system of claim 1, wherein each of the first latch device and the trip latch device comprises at least one mechanical linkage.

12. The drive system of claim 11, wherein the trip latch device comprises: first and second mechanical linkages; the first mechanical linkage is connected to the crank device at a first moveable pivot point and to the second mechanical linkage at a second moveable pivot point; and the second mechanical linkage is coupled to the first latch device at a fixed pivot point.

13. The drive system of claim 12, wherein each moveable pivot and each fixed pivot point comprises a movement enhancement device.

14. The drive system of claim 1, wherein the first latch device comprises an over-toggle latch; and the trip latch device comprises a trip over-toggle latch coupled to a linear tension spring.

15. An electrical apparatus comprising:
- a switching system comprising:
  - a first electrical contact;
  - a second electrical contact; and
  - a switch actuation device controllable to move the second electrical contact relative to the first electrical contact; and
- a drive system comprising:
  - a first latch device;
  - a trip latch device coupled to the first latch device; and
  - a crank device coupled to the trip latch device and configured to control the switch actuation device to move the second electrical contact relative to the first electrical contact, wherein the trip latch device moves laterally without substantially changing shape during an ordinary open operation of the switching system and during an ordinary close operation of the switching system.

16. The electrical apparatus of claim 15, wherein the drive system is configured to hold the drive actuation device such that the second electrical contact only moves relative to the first electrical contact during the ordinary open operation, the ordinary close operation, or a trip operation.

17. The electrical apparatus of claim 15, wherein the trip latch device comprises a plurality of moveable pivot points, the trip latch device maintains a substantially linear shape during the ordinary open operation or the close operation, and the trip latch device changes shape during a trip operation.

18. The electrical apparatus of claim 15, wherein the switching system has a current interruption rating of up to 25 kiloamperes (kA) and a voltage rating of 4 kilovolts (kV) to 38 kV.

19. The electrical apparatus of claim 15, wherein the switching system is a solid dielectric switch.

20. A system comprising:

a plurality of single-phase switches, each switch configured to be coupled to one phase of a multi-phase alternating current (AC) power system and each switch comprising:

a first electrical contact;

a second electrical contact; and a switch actuation device controllable to move the second electrical contact relative to the first electrical contact; and a plurality of drive systems, each drive system comprising:

a first latch device;

a trip latch device coupled to the first latch device; and a crank device coupled to the trip latch device and configured to control the switch actuation device of one of the single-phase switches to move the second electrical contact relative to the first electrical contact of the one of the single-phase switches, wherein the trip latch device moves laterally without substantially changing shape during an ordinary open operation and during an ordinary close operation.

21. The system of claim 20, wherein each drive system further comprises a manual operating interface coupled to the first latch device, the manual operating interface of each drive system is a handle, and each handle is configured for simultaneous manual operation such that the second electrical contacts of all of the single-phase switches move relative to the respective first electrical contact simultaneously in response to operation of the handles.

22. The system of claim 20, wherein each drive system further comprises a trip actuation device configured to act on the trip latch device to drive the crank device of the one of the single-phase switches in response to an indication of a fault condition, and the trip actuation devices are configured for simultaneous operation such that all of the single-phase switches trip simultaneously in response to the fault condition.

* * * * *